(12) United States Patent
Takenaka et al.

(10) Patent No.: US 10,983,411 B2
(45) Date of Patent: Apr. 20, 2021

(54) METAL-OXIDE-SEMICONDUCTOR (MOS) OPTICAL MODULATOR AND METHOD OF MANUFACTURING SAME

(71) Applicant: THE UNIVERSITY OF TOKYO, Tokyo (JP)

(72) Inventors: Mitsuru Takenaka, Tokyo (JP); Jae-Hoon Han, Tokyo (JP); Shinichi Takagi, Tokyo (JP)

(73) Assignee: THE UNIVERSITY OF TOKYO, Tokyo (JP)

( * ) Notice: Subject to any disclaimer, the term of this patent is extended or adjusted under 35 U.S.C. 154(b) by 0 days.

(21) Appl. No.: 16/325,895

(22) PCT Filed: Aug. 17, 2017

(86) PCT No.: PCT/JP2017/029548
§ 371 (c)(1),
(2) Date: Jun. 7, 2019

(87) PCT Pub. No.: WO2018/034322
PCT Pub. Date: Feb. 22, 2018

(65) Prior Publication Data
US 2019/0285964 A1    Sep. 19, 2019

(30) Foreign Application Priority Data
Aug. 17, 2016 (JP) .............................. JP2016-160229

(51) Int. Cl.
*G02F 1/225* (2006.01)
*G02F 1/025* (2006.01)
(Continued)

(52) U.S. Cl.
CPC ............ *G02F 1/2257* (2013.01); *G02F 1/025* (2013.01); *G02F 2001/212* (2013.01); *G02F 2201/063* (2013.01)

(58) Field of Classification Search
CPC ..................................................... G02F 1/2257
See application file for complete search history.

(56) References Cited

U.S. PATENT DOCUMENTS

| 10,120,128 B2 * | 11/2018 | Iida | .................. G02B 6/136 |
| 2011/0097030 A1 * | 4/2011 | Urino | ..................... G02F 1/025 385/3 |

(Continued)

FOREIGN PATENT DOCUMENTS

| JP | 2013214044 A | 10/2013 |
| JP | 2013238657 A | 11/2013 |

(Continued)

OTHER PUBLICATIONS

Reed, G.T., et al., Silicon Optical Modulators, Nature Photonics, vol. 4 Aug. 2010 copyright 2010 Macmillan Publishers Limited.

(Continued)

*Primary Examiner* — Eric Wong
(74) *Attorney, Agent, or Firm* — Fox Rothschild LLP; Robert J. Sacco; Carol E. Thorstad-Forsyth

(57) ABSTRACT

A MOS optical modulator having high modulation efficiency and a method of manufacturing the same are provided. A MOS optical modulator includes: a p-type Si layer constituting an optical waveguide; a gate insulating film provided on the optical waveguide; a gate layer provided on the gate insulating film and formed of an n-type group III-V semiconductor; a first contact portion connected to the gate layer; and a second contact portion connected to the Si layer.

8 Claims, 14 Drawing Sheets

(51) Int. Cl.
 *G02F 1/017* (2006.01)
 *G02F 1/21* (2006.01)

(56) References Cited

U.S. PATENT DOCUMENTS

2013/0343694 A1\* 12/2013 Akimoto ............... B82Y 20/00
 385/3
2017/0371226 A1\* 12/2017 Song .................... G02F 1/3133

FOREIGN PATENT DOCUMENTS

JP   2014126728 A   7/2014
WO  2011/037686 A1  3/2011

OTHER PUBLICATIONS

Fujikata, J., et al., "High-speed and high-efficiency Si optical modulator with MOS junction, using solid-phase crystallization of polycrystalline silicon," Japanese Journal of Applied Physics, 2016 Jpn. J. Appl. Phys. 55 042202.

Han, J.J., et al., "Extremely high modulation efficiency iii-v/si hybrid mos optical modulator fabricated by direct wafer bonding," Electron Devices Meeting (IEDM) 2016 IEEE International.

\* cited by examiner

METAL-OXIDE-SEMICONDUCTOR (MOS) OPTICAL MODULATOR AND METHOD OF MANUFACTURING SAME

CROSS REFERENCE TO RELATED APPLICATIONS

This application is a U.S. National Stage entry under 35 U.S.C. § 371 based on International Application No. PCT/JP2017/029548, filed on Aug. 17, 2017, and which claims priority to Japanese Patent Application No. 2016-160229, filed on Aug. 17, 2016, both of which are hereby incorporated herein by reference in their entireties.

TECHNICAL FIELD

The present invention relates to an MOS optical modulator and a method of manufacturing the same.

BACKGROUND ART

There is known silicon photonics in which fine optical waveguides and the like are formed on a silicon substrate to form optical devices such as an optical modulator, a light receiver, and a light emitting element. Many structures of optical modulators using this silicon photonics have been proposed. MOS type, PIN type, PN type are known as the structures of the optical modulators (for example, see Non Patent Literatures 1 and 2).

For example, the MOS optical modulator described in Non-Patent Literature 2 has a structure including an optical waveguide formed on a p-doped Si layer of an SOI (Si-on-insulator) substrate, and a gate insulating film and an n-doped polysilicon layer which are stacked on the optical waveguide. In this MOS optical modulator, by applying a driving voltage between the Si layer and the polysilicon layer, carriers are accumulated at the interface between the Si layer and the gate insulating film and at the interface between the polysilicon layer and the gate insulating film, and the refractive index is changed by a carrier plasma effect, thereby modulating the phase of light.

CITATION LIST

Non Patent Literature

Non Patent Literature 1: G. Reed, G. Mashanovich, F. Gardes, and D. Thomson, "Silicon optical modulators," Nat. Photonics, vol. 4, no. 8, pp. 518-526, July 2010.
Non Patent Literature 2: J. Fujikata, M. Takahashi, S. Takahashi, T. Horikawa, and T. Nakamura, "High-speed and high-efficiency Si optical modulator with MOS junction, using solid-phase crystallization of polycrystalline silicon," Jpn. J. Appl. Phys., vol. 55, no. 4, p. 042202, April 2016.

SUMMARY OF THE INVENTION

Technical Problem

Incidentally, the optical modulators having various structures which are manufactured by using the silicon photonics as described above have insufficient modulation efficiency, and sufficient modulation efficiency has not yet been obtained even in MOS optical modulators which have been expected to have the highest modulation efficiency.

The present invention has been made in view of the above circumstances, and has an object to provide an MOS optical modulator having a high modulation efficiency and a method of manufacturing the same.

Solution to Problem

A MOS optical modulator according to the present invention includes: a p-type Si layer constituting an optical waveguide; a gate insulating film provided on the optical waveguide; a gate layer provided on the gate insulating film and formed of an n-type group III-V semiconductor; and a first contact portion connected to the gate layer and a second contact portion connected to the Si layer for applying a drive voltage between the Si layer and the gate layer.

A method of manufacturing a MOS optical modulator according to the present invention includes: a gate forming step of pasting a substrate having a gate layer including a single layer or a plurality of layers made of an n-type group III-V semiconductor and a gate insulating film formed on a surface of the gate layer onto an upper surface of a p-type Si layer serving as an optical waveguide while the gate insulating film and the upper surface of the optical waveguide are brought into close contact with each other, thereby forming the gate insulating film and the gate layer on the optical waveguide; and a contact portion forming step of forming a first contact portion connected to the gate layer and a second contact portion connected to the Si layer for applying a voltage between the Si layer and the gate layer.

Advantageous Effects of Invention

According to the optical modulator of the present invention, since the effective mass of electrons in the group III-V semiconductor used for the gate layer is small, the magnitude of the change in the refractive index when the drive voltage applies, so that the modulation efficiency can be enhanced.

Furthermore, according to the method for manufacturing an optical modulator of the present invention, a structure in which the group III-V semiconductor as a gate layer is stacked on an Si layer can be easily obtained.

DESCRIPTION OF EMBODIMENT

Figure 1:
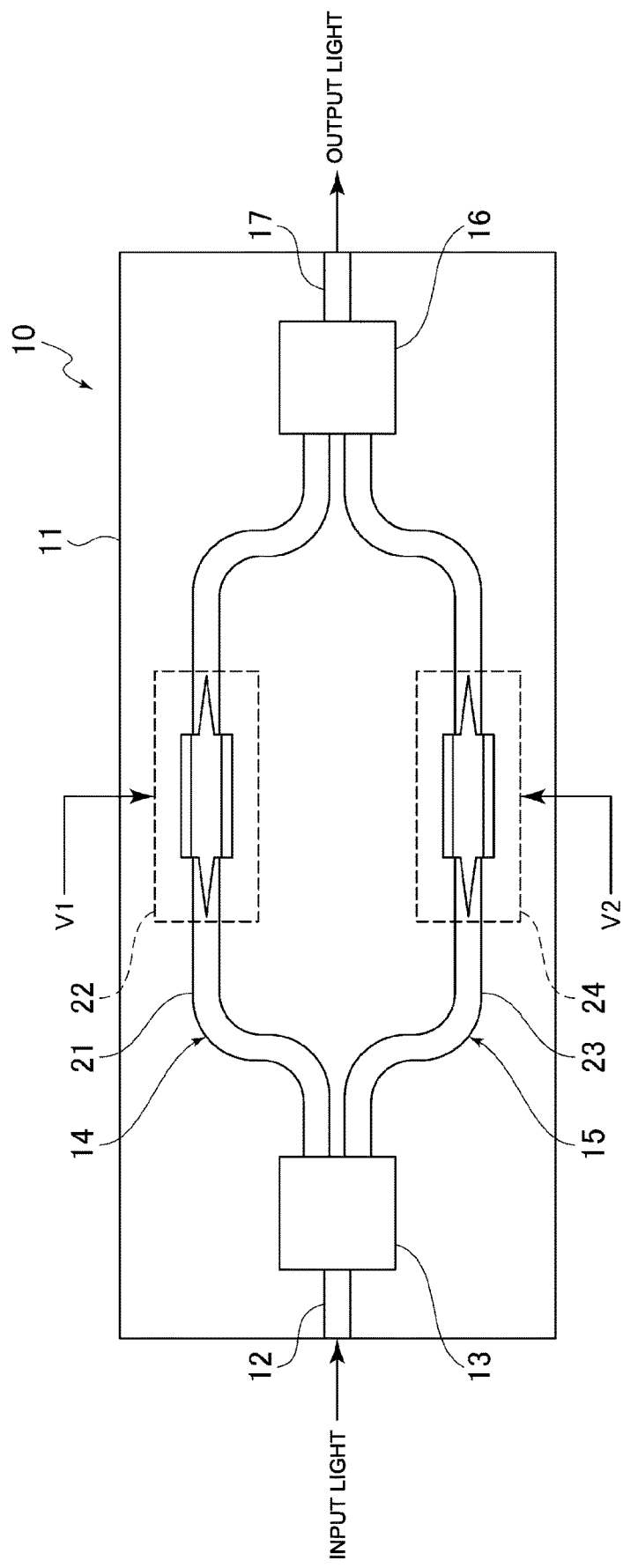
FIG. 1 is a plan view showing a Mach-Zehnder interferometer type light intensity modulation device in which the present invention is implemented.

In FIG. 1, a Mach-Zehnder interferometer type light intensity modulation device (hereinafter referred to as MZ intensity modulation device) 10 in which the present invention is implemented is formed on a silicon substrate 11, and includes an input-side optical waveguide 12, an optical branching unit 13, a first arm 14, a second arm 15, an optical coupling unit 16, and an output-side optical waveguide 17. The first arm 14 has an optical waveguide 21 and a MOS optical modulator 22. Furthermore, the second arm 15 has an optical waveguide 23 and a MOS optical modulator 24. The optical branching unit 13 is connected to the input-side optical waveguide 12 and each of the optical waveguides 21 and 23, and branches light input from the input-side optical waveguide 12 to each of the optical waveguides 21 and 23. The optical coupling unit 16 is connected to each of the optical waveguides 21 and 23 and the output-side optical waveguide 17, and combines lights from the optical waveguides 21 and 23 and outputs combined light to the output-side optical waveguide 17.

The MOS optical modulator 22 provided to the first arm 14 modulates the phase of light passing through the optical waveguide 21 by applying a drive voltage V1 to the MOS optical modulator 22 as described later. That is, the phase of the light is shifted by a shift amount corresponding to the drive voltage V1. Likewise, the MOS optical modulator 24 provided to the second arm 15 performs phase modulation on light passing through the optical waveguide 23 by a shift amount corresponding to a drive voltage V2 by applying the drive voltage V2 to the MOS optical modulator 24. As a result, the optical coupling unit 16 performs phase interference on the lights from the optical waveguides 21, and outputs output light which has been subjected to light intensity modulation. In the MZ intensity modulation device 10, the MOS optical modulator is provided to each of the first arm 14 and the second arm 15, but the MOS optical modulator may be provided to only one arm.

Figure 2:
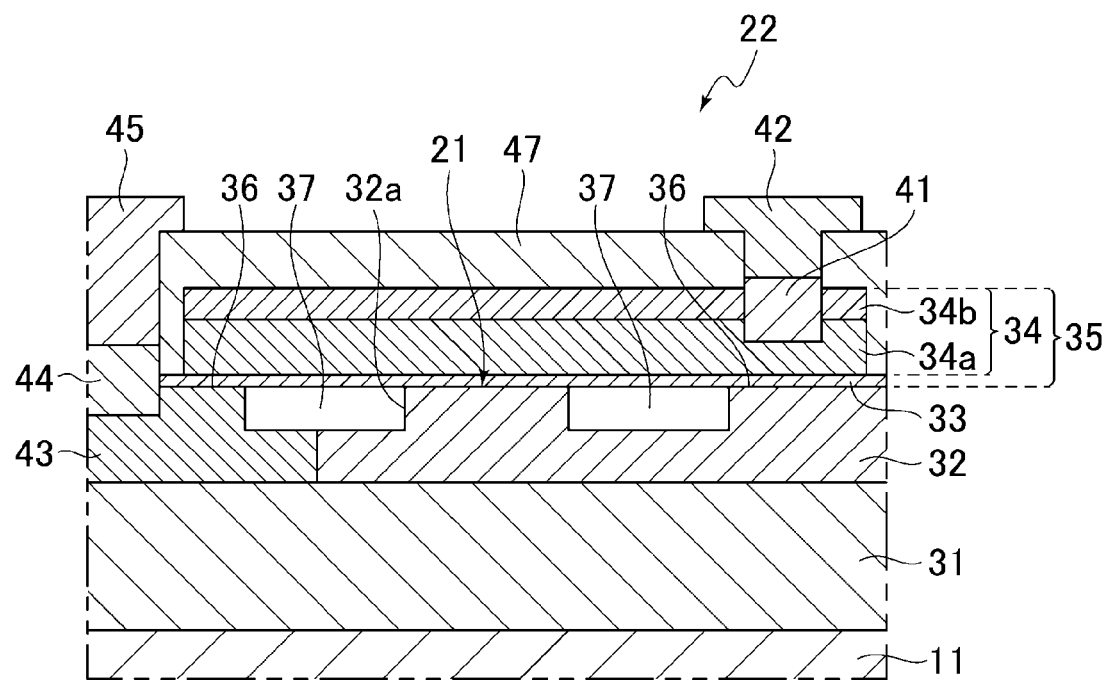
FIG. 2 is a cross-sectional view showing a structure of an optical modulator.

Hereinafter, the MOS optical modulator 22 will be described. Since the MOS optical modulator 24 has the same structure as the MOS optical modulator 22, detailed description thereof will be omitted. In FIG. 2, the MOS optical modulator (hereinafter referred to as optical modulator) 22 is configured so that an $SiO_2$ layer 31, a Si (silicon) layer 32, a gate insulating film 33, a gate layer 34, and the like are stacked on a silicon substrate 11. Note that in FIG. 2, the thickness of each part of the optical modulator 22 is depicted exaggeratedly for convenience of description.

The Si layer 32 is provided with a rib 32a on a surface thereof (a surface on the side opposite to the $SiO_2$ layer 31), and the rib type optical waveguide 21 is configured by the rib 32a and a portion of the Si layer 32 which is just below the rib 32a. The rib 32a, that is, the optical waveguide 21 is provided so as to extend in a light transmission direction (the direction perpendicular to the drawing). This Si layer 32, including the rib 32a, is a p-doped p-type semiconductor. For example, the height of the rib 32a is equal to about 100 nm to 150 nm, the width thereof (the length in the right-and-left direction of the drawing) is equal to about 400 nm to 1000 nm, and the thickness of the Si layer 32 under the rib 32a is equal to about 70 nm to 120 nm.

The Si layer 32 has a pair of terraces 36 which are provided on the surface of the Si layer 32 so as to sandwich the rib 32a therebetween, and a gap between each terrace 36 and the rib 32a serves as a trench 37 along the rib 32a. Therefore, a predetermined interval is provided between the rib 32a and the terrace 36. The terrace 36 is unnecessary from the viewpoint of the function of phase modulation, but as described later, it is utilized to paste the gate insulating film 33 and the gate layer 34 onto the rib 32a, and has an effect of facilitating the pasting. The trench 37 is kept hollow, and the hollow interior of the trench 37 is made to function as a clad having a refractive index lower than that of the Si layer 32. Note that the trench 37 may be filled with, for example, $SiO_2$ or the like which has a refractive index lower than that of the Si layer 32. In this example, a portion of the Si layer 32 where the terraces 36 and the trenches 37 are formed is a second extending region extending from the optical waveguide 21 in the width direction of the optical waveguide 21, and the second extending region exists on both sides of the optical waveguide 21.

The gate insulating film 33 and the gate layer 34 are stacked on the upper surface of the rib 32a (hereinafter, the gate insulating film 33 and the gate layer 34 are collectively referred to as a gate portion 35). A MOS structure is formed by the Si layer 32, the gate insulating film 33, and the gate layer 34 which are stacked as described above. In this example, the gate layer 34 is provided on almost the entire surface of the upper surface of the gate insulating film 33, and the gate insulating film 33 and the gate layer 34 extend from the upper surface of the rib 32a to the upper surface of each of the terraces 36 in the width direction of the optical waveguide 21. Therefore, the gate insulating film 33 and the gate layer 34 are provided above a region where the rib 32a, the terraces 36, and the trenches 37 are formed. Note that in the width direction of the optical waveguide 21, respective portions of the gate insulating film 33 and the gate layer 34 which are located on the outside of the optical waveguide 21 (rib 32a) serve as respective first extending regions.

Although the gate insulating film 33 is formed, for example, by using aluminum oxide ($Al_2O_3$), the gate insulating film 33 is not limited to this, and may be a thin film of silicon oxide ($SiO_2$), hafnium oxide ($HfO_2$), or the like. It is desirable that the thickness of the gate insulating film 33 is as small as possible in order to improve the modulation efficiency. However, in order to suppress an increase of leak current caused by a quantum tunneling effect, a film thickness of 3 nm or more is required. On the other hand, from the viewpoint of modulation speed, it is desirable that the thickness of the gate insulating film 33 is an appropriate thickness. Considering both the modulation efficiency and the modulation speed, it is preferable that the thickness is set to, for example, about 3 nm to 10 nm.

The gate layer 34 is a single layer or a stacked multilayer (two or more layers) of an n-doped n-type group III-V semiconductor. In this example, the gate layer 34 includes a first layer 34a on the side of the gate insulating film 33 and a second layer 34b formed on the first layer 34a. The first layer 34a is formed of n-type InGaAsP, and the second layer 34b is formed of n-type InP. In addition to InGaAsP and InP, InGaAs, InAlAs, GaAs, AlGaAs, GaSb, AlGaSb, InSb, InGaSb, or the like may be used as the group III-V semiconductor used for the gate layer 34.

When the gate layer 34 is a multilayer, it is possible to individually design a layer contributing to optical modulation, a layer contributing to optical confinement and a layer forming a contact. On the other hand, when the gate layer 34 is a single layer, a manufacturing process can be simplified. When the gate layer 34 is formed of a multilayer, the order of stacking layers of the group III-V semiconductor in the gate layer 34 is not particularly limited, but it is preferable that a material having a lighter effective mass of electrons and a larger refractive index is provided on the side of the gate insulating film 33. This makes it possible to use a material having a large phase modulation effect, and furthermore, by further concentrating the optical confinement in the vicinity of the gate insulating film, the optical modulation efficiency can be increased. When the gate layer 34 is configured by two layers of InGaAsP (first layer 34a) and InP (second layer 34b) as in the case of the above example, the effective mass of electrons is lighter and the refractive index is larger as compared with InP, so that it is preferable that InGaAsP is formed on the side of the gate insulating film 33.

It is preferable that the entire thickness of the gate layer 34 is designed so that optical electric field is maximized in the vicinity of the gate insulating film, and in the case of the multilayer, it is preferable that the thickness of each layer is set such that the optical electric field is maximized in the vicinity of the gate insulating film. In this example, the entire thickness of the gate layer 34 is set to about 100 nm to 200 nm, the thickness of the first layer is set to about 50 to 120 nm, and the thickness of the second layer is set to about 50 to 80 nm.

Figure 3:
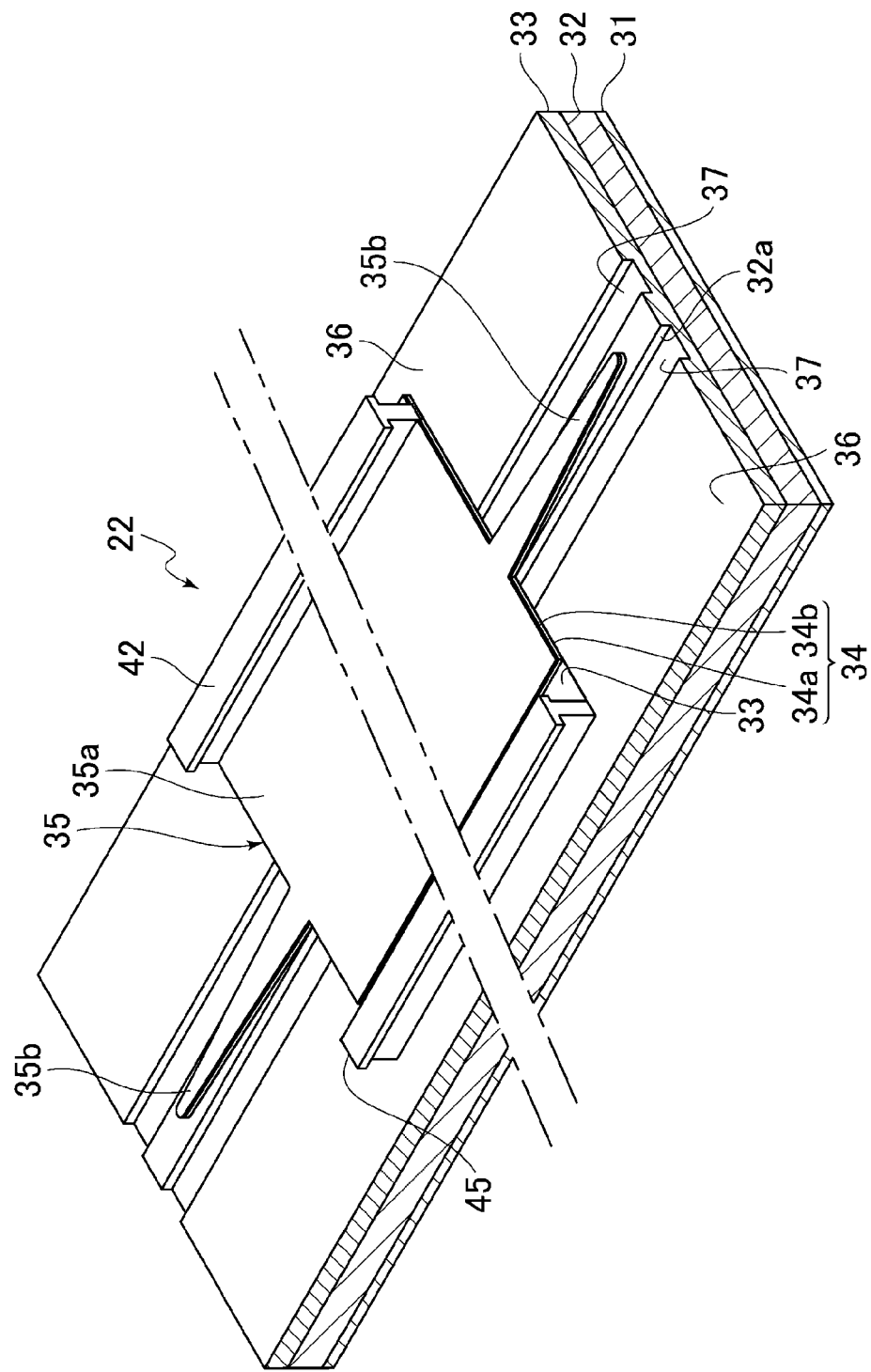
FIG. 3 is a perspective view showing a shape of a gate portion of the optical modulator.

As shown in FIG. 3, the gate portion 35 has a rectangular region 35a and a pair of tapered regions 35b. The rectangular region 35a includes a portion above the rib 32a and a portion extending to the upper surface of each terrace 36. The tapered regions 35b are provided on the rib 32a and extend from both ends of the rectangular region 35a along a light propagation direction. Each tapered region 35b has a connecting portion with the rectangular region 35a, the connecting portion having the same width as the rib 32a or a width which is slightly narrower than the rib 32a, and is shaped such that the width thereof gradually decreases as it shifts away from the rectangular region 35a. This tapered region 35b has a function of smoothly connecting an optical signal propagating through the rib 32a to the rectangular region 35a.

In FIG. 2, the gate layer 34 and a first electrode 42 are connected to each other via a first contact portion 41. The first contact portion 41 is provided for establishing ohmic contact. This first contact portion 41 is provided in the first extending region of the gate layer 34, that is, the first contact portion 41 is placed while shifted from the position just above the rib 32a in the width direction of the rib 32a and located at a position away from the position just above the rib 32a. As a result, an effect of confining input light in the gate layer 34 is made sufficient while the gate layer 34 is thinned, whereby a light transmission loss is suppressed to be smaller.

The first contact portion 41 is formed of an alloy of a group III-V semiconductor and Ni (nickel). In this example, the first contact portion 41 is formed by alloying the III-V group semiconductor at a portion of the gate layer 34 and Ni (nickel), specifically, it is formed of an alloy of InGaAsP of the first layer 34a and Ni. The use of the alloy of the group III-V semiconductor and Ni as the first contact portion 41 is advantageous in that the RC time constant of the optical modulator 22 is reduced to further increase an operation speed because the electric resistance of the alloy is very low. The first electrode 42 is formed of Au (gold), for example.

Note that when the first contact portion 41 is formed by alloying the gate layer 34 and Ni, the group III-V semiconductor of any layer constituting the gate layer 34 may be alloyed with Ni, or the group III-V semiconductor of each of plural layers may be alloyed with Ni. Accordingly, for example, InP of the second layer 34b and Ni may be alloyed with each other to form the first contact portion 41, or an alloyed portion obtained by alloying each of InGaAsP of the first layer 34a and InP of the second layer 34b with Ni may be set as the first contact portion 41. Furthermore, the alloy of the III-V group semiconductor and Ni is used for the first contact portion 41, but the present invention is not limited to this style. For example, an $n^+$-type semiconductor obtained by making the doping density at a part of the gate layer 34 higher may be used. Furthermore, the depth of the first contact portion 41 in the gate layer 34 is arbitrary, and for example, the first contact portion 41 may penetrate through the gate layer 34 and reach the gate insulating film 33.

The Si layer 32 is connected to a second electrode 45 via a second contact portion 43 and an alloy portion 44. A part of the Si layer 32 on the side of the terrace 36 serves as the second contact portion 43, and the second contact portion 43 is formed of a $p^+$-type semiconductor in which the doping density is made higher than that at the other portion of the Si layer 32. The alloy portion 44 is formed by alloying Si of the second contact portion 43 and Ni, and the second electrode 45 is formed of Au on the alloy portion 44. Reference sign 47 denotes a protective film formed of $SiO_2$, for example.

In the optical modulator 22, a drive voltage V1 is given so that the second electrode 45 is set as a reference (0V) and the first electrode 42 is set as a minus voltage, and the drive voltage V1 is applied between the gate layer 34 and the Si layer 32. The optical modulator 22 modulates the phase of light by utilizing change in the refractive index caused by a carrier plasma effect. That is, by applying the drive voltage V1 between the gate layer 34 and the Si layer 32, electrons are accumulated at the interface between the gate layer 34 and the gate insulating film 33, that is, the electron density increases, and the refractive index to light transmitted through the optical waveguide 21 changes due to the effect of the increased electron density.

In the optical modulator 22 using the carrier plasma effect, the refractive index change Δn is larger as the effective mass of carriers (electrons in the gate layer 34 in this example) is smaller. In the group III-V semiconductor used for the gate layer 34, the effective mass of electrons is smaller than silicon or the like. Therefore, the absolute value of the refractive index change Δn increases with the increase in the electron density when the drive voltage V1 is applied, and the refractive index change Δn increases to 10 times or more of that of silicon. On the other hand, an absorption change Δα caused by the increase in electron density is extremely small. Furthermore, when the drive voltage V1 is applied, the density of holes (holes) increases at the interface between the Si layer 32 and the gate insulating film 33. However, the refractive index change and the absorption change are extremely small as compared with the group III-V semiconductor, so that the influence is little. Therefore, as compared with a MOS optical modulator having a structure in which a silicon gate layer is formed on a silicon optical waveguide so as to sandwich a gate insulating film therebetween, the optical modulator 22 having the structure in which the gate layer 34 formed of the n-type group III-V semiconductor is formed on the optical waveguide 21 of the p-type Si layer 32 so as to sandwich the gate insulating film 33 therebetween has high modulation efficiency and a low loss. Note that the group III-V semiconductor has a crystal structure in the gate layer 34, so that light scattering inside the group III-V semiconductor is small and the optical loss is small.

Figure 4:
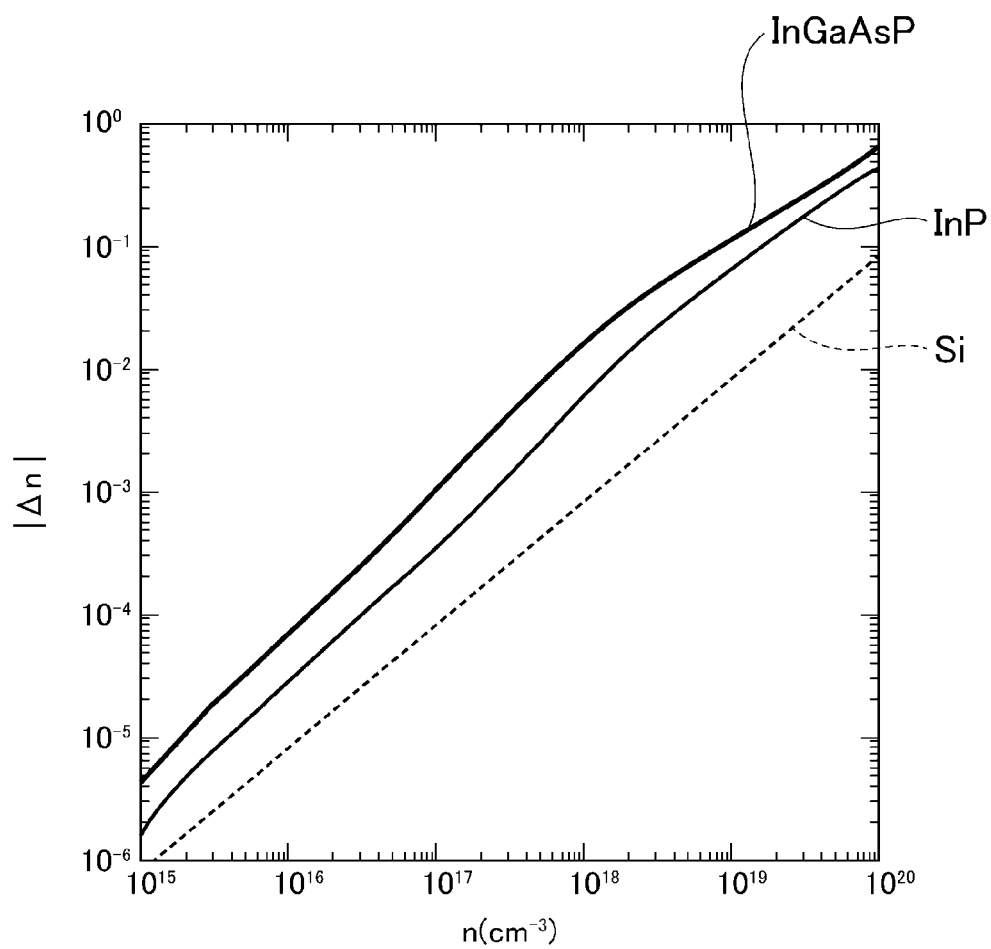
FIG. 4 is a graph showing the relationship between carrier density and refractive index change.
Figure 5:
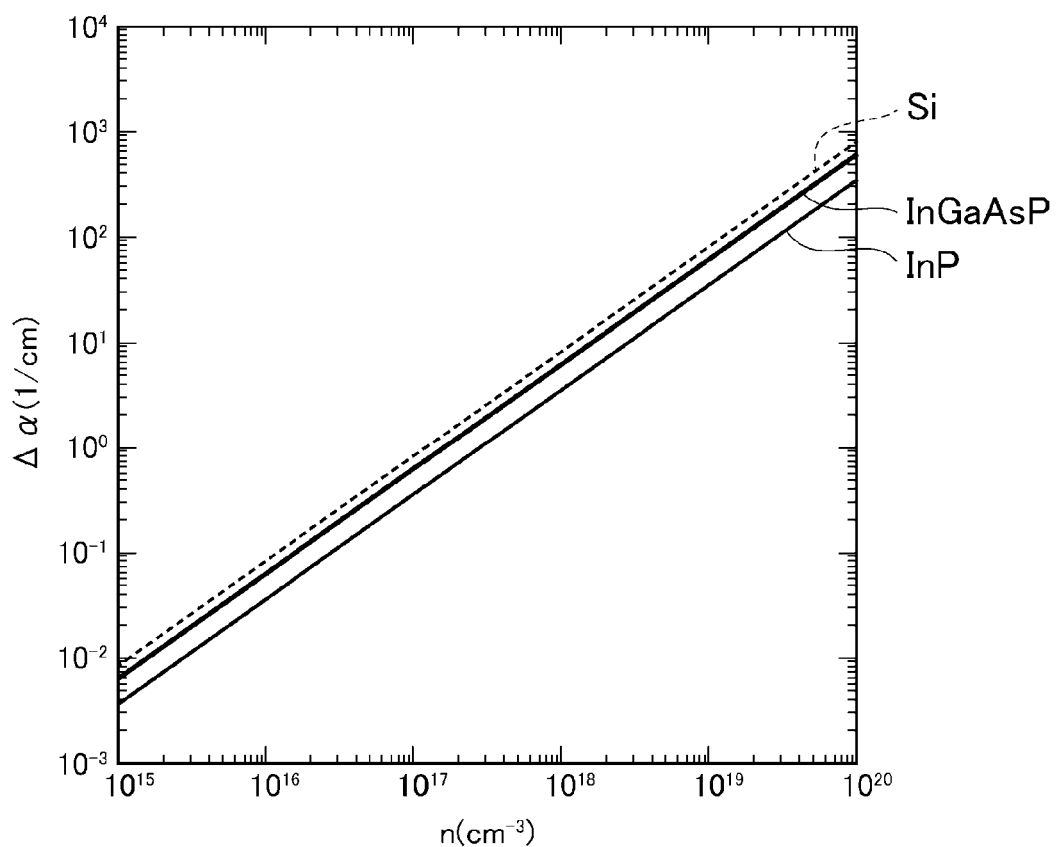
FIG. 5 is a graph showing the relationship between carrier density and absorption change.

FIG. 4 and FIG. 5 show calculation results of the relationship between each of the refractive index change Δn (absolute value) and the absorption change Δα in InGaAsP (the composition corresponding to λg=1.37 μm), InP, and Si and the electron density. Here, the composition corresponding to λg=1.37 μm means $In_{0.68}Ga_{0.32}As_{0.7}P_{0.3}$. As shown in FIG. 4 and FIG. 5, it is apparent that in InGaAsP (the composition corresponding to λg=1.37 μm), the refractive index change Δn (absolute value) is large and the absorption change Δα is small as compared with Si. In InGaAsP, its refractive index change Δn (absolute value) reaches about 17 times of that of Si, but the absorption change Δα is the same level as or smaller than that of Si. Note that in respective graphs of FIG. 4 and FIG. 5, the abscissa axis represents the electron density in each material, and the ordinate axis represents the refractive index change Δn and the absorption change Δα at the electron density, respectively.

Figure 6:
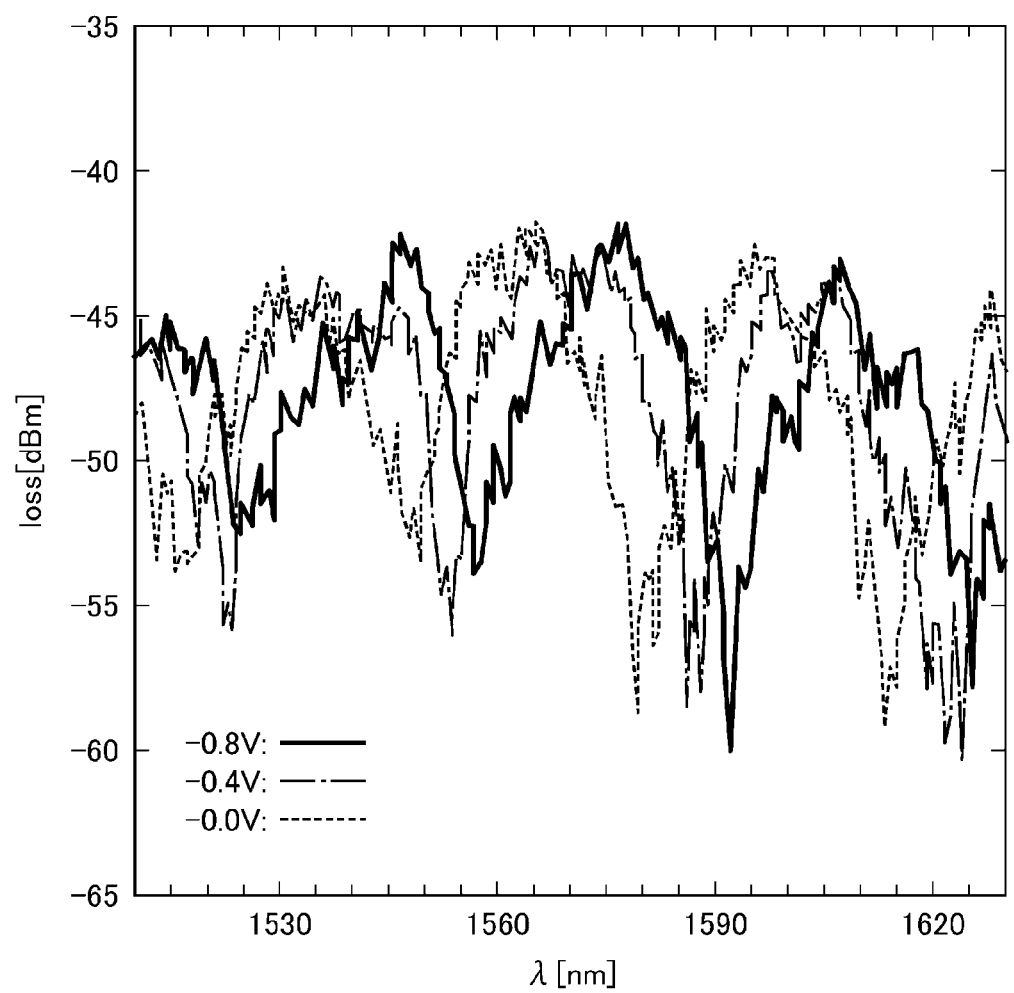
FIG. 6 is a graph showing a measurement result of loss of light of each wavelength with respect to variation in drive voltage.

FIG. 6 shows a measurement result of a transmission wavelength spectrum when light from the first arm 14 which is subjected to phase modulation by the optical modulator 22 and light from the second arm 15 which is not subjected to phase modulation are caused to interfere with each other. Here, in order to accurately evaluate a phase change amount, an asymmetric Mach-Zehnder interferometer in which the arm on one side is made longer than the arm on the other side by about 20 μm is configured. Since there is a difference in the arm length, even when the drive voltage V1 is not applied, wavelengths at which the light intensity periodically decreases appear periodically in the transmission spectrum. When the drive voltage V1 is applied and the phase difference between both the arms changes, the positions of the wavelengths at which the light intensity decreases are shifted in the transmission spectrum. From this shift amount, it is possible to quantitatively evaluate the phase change amount. FIG. 6 shows measurement results of the transmission spectra when the drive voltage V1 is set to 0V, −0.4 V, and −0.8 V, respectively. The drive voltage V2 for the optical modulator 24 of the second arm 15 was set to 0V so that no phase modulation was performed in the optical modulator 24. Furthermore, an optical modulator 22 in which the gate layer 34 was configured to have a multilayer structure of InGaAsP and InP was used. From this measurement result, the wavelengths at which the light intensity was weakened shift to the right side according to the drive voltage V1, and it was confirmed that the optical modulator 22 configured as described above performed phase modulation on light propagating through the optical waveguide 21.

Figure 7:
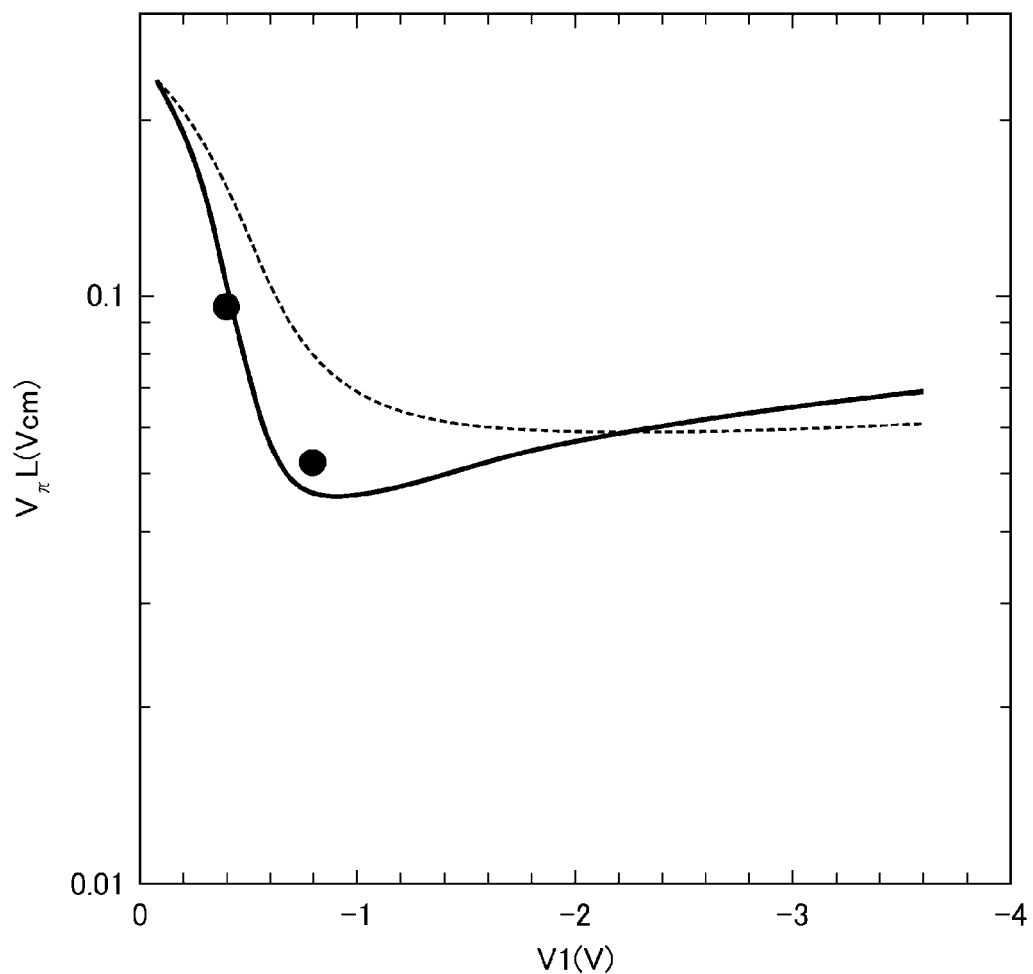
FIG. 7 is a graph showing the relationship between the drive voltage and VπL value.

FIG. 7 shows a calculation result of the relationship between a VπL value indicating the modulation efficiency and the drive voltage V1. The calculation of the VπL value was performed for a case where the gate layer 34 was configured to have a single layer structure of only InGaAsP. A solid line in a graph of FIG. 7 indicates the VπL value obtained from the inclination of the phase change at each voltage value, and a broken line indicates the VπL value obtained from the phase change amount from 0V. Furthermore, the graph of FIG. 7 also shows VπL values obtained from the measurement result shown in FIG. 6 at the drive voltage V1 of "−0.8 V" and "−0.4 V". The VπL value is the product of the driving voltage necessary for shifting the phase of light by a half wavelength (π) in the optical modulator, that is, a half wavelength voltage Vπ and the length L of the optical modulator, and is also an index representing the performance of the optical modulator. The modulation efficiency is higher as the VπL value is smaller. When the gate layer 34 is configured to have a multilayer structure of InGaAsP and InP, 0.04 Vcm to 0.05 Vcm was actually measured as the VπL value, and it was confirmed that the modulation efficiency was high.

Furthermore, the group III-V semiconductor constituting the gate layer 34 has a small effective mass of electrons serving as carriers, that is, has a high mobility. Furthermore, since the III-V group semiconductor has low resistance, the RC time constant is small. Therefore, a high operation speed of the optical modulator 22 can be obtained as compared with the MOS optical modulator in which the gate insulating film and the silicon layer are stacked on the optical waveguide. When the group III-V semiconductor is used for the gate layer 34, since the VπL value is small as described above, it is possible to make the VπL value small even when the gate insulating film is made thick as compared with the MOS type optical modulator in which the gate insulating film and the silicon layer are stacked on the optical waveguide. It is apparent that as the gate insulating film is thicker, the gate capacitance value is smaller correspondingly and thus the RC time constant is smaller, so that the modulation frequency can be increased.

Next, a procedure of manufacturing the optical modulator 22 will be described. The optical modulator 22 is manufactured by sequentially performing first to eighth steps described below. The manufacturing procedure of the optical modulator 22 described below is merely an example, and the present invention is not limited to the example. In the manufacturing of the optical modulator 22, for example, an SOI (Si-on-Insulator) substrate can be used. In this case, a silicon substrate as a base of the SOI substrate corresponds to the silicon substrate 11, a buried oxide film (BOX layer) on the silicon substrate corresponds to the $SiO_2$ layer 31, and a silicon layer above the buried oxide film corresponds to the Si layer 32.

Figure 8:
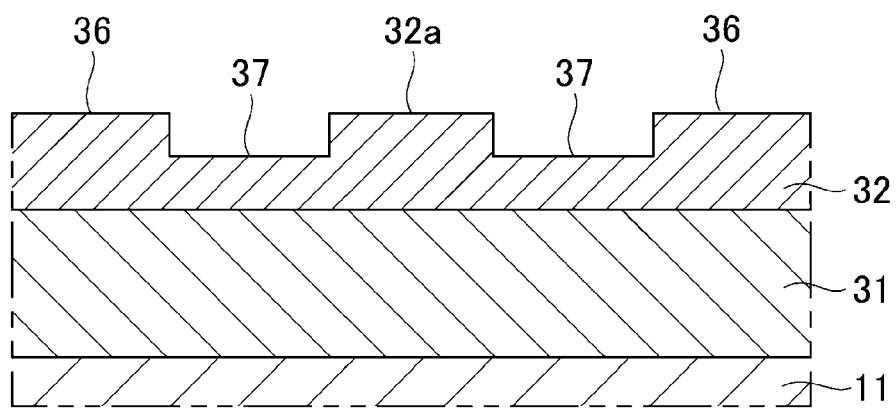
FIG. 8 is a diagram showing a step of forming a rib and a terrace.

In a first step, a resist mask having a pattern having openings corresponding to the trenches 37 is formed on the Si layer 32 which is p-doped in advance. The resist mask in this first step and a resist mask in each of the following steps may be formed by using a general photolithography technique. After the formation of the resist mask, the Si layer 32 at a portion which is not covered with the resist mask is dry-etched to form the trenches 37. Thereafter, the resist mask is removed. By this first step, as shown in FIG. 8, the rib 32a and the pair of terraces 36 are formed in the Si layer 32.

Figure 9:
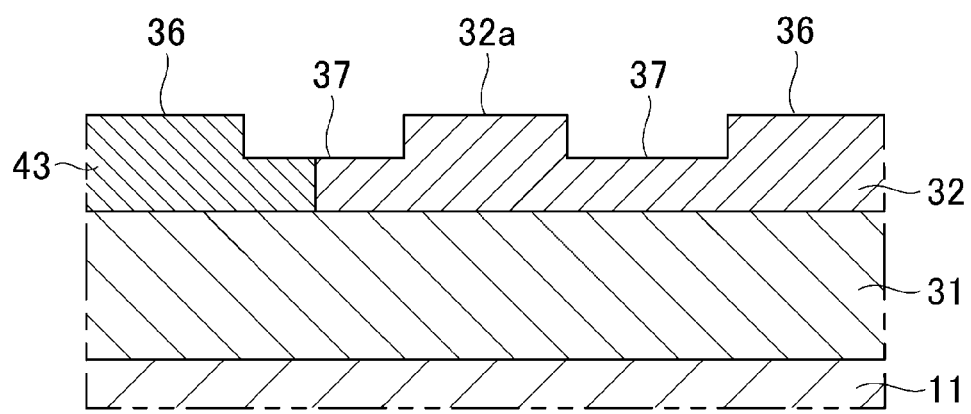
FIG. 9 is a diagram showing a step of forming a second contact portion.

In a second step, after removing the resist mask used in the first step, a resist mask having a pattern having an opening corresponding to the second contact portion 43 is formed on the Si layer 32. Thereafter, B (boron) or the like is ion-implanted through the opening of the resist mask to form the second contact portion 43 p-doped at high concentration in the Si layer 32 as shown in FIG. 9.

Figure 10A:
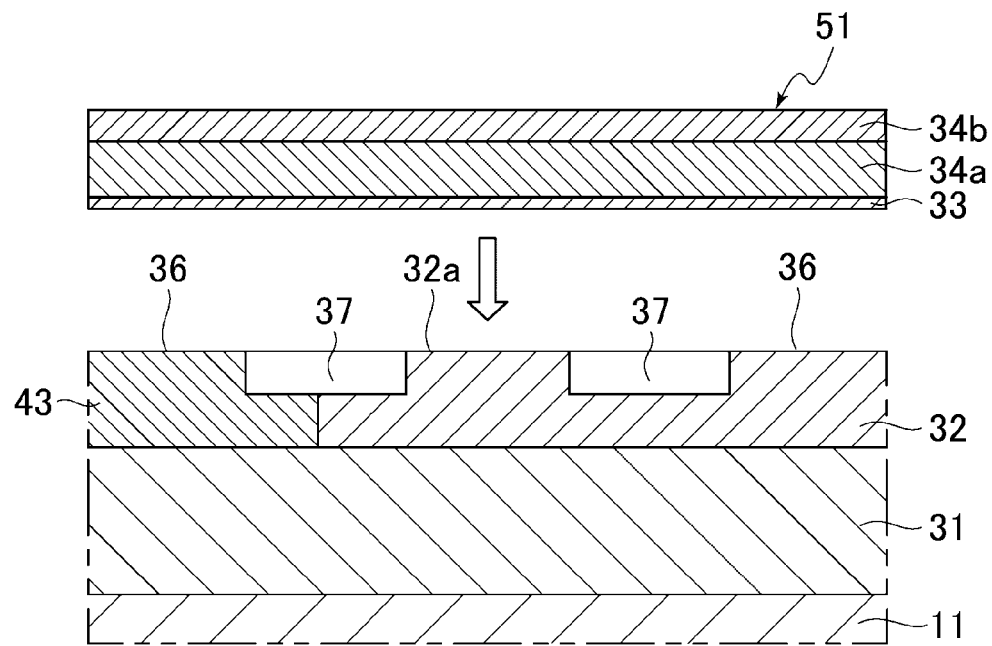
FIG. 10A is a diagram showing a state before a pasting substrate is pasted to an Si layer.
Figure 10B:
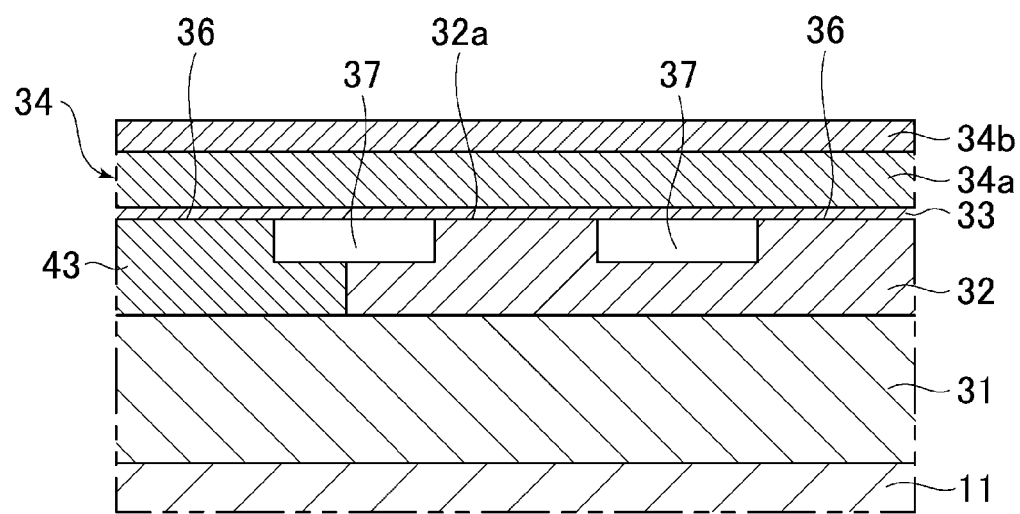
FIG. 10B is a diagram showing a state after the pasting substrate has been pasted to the Si layer.

In a third step, after removing the resist mask used in the second step, as shown in FIG. 10A, a pasting substrate 51 which has been prepared in advance and will serve as the gate portion 35 is pasted to the upper surface of the Si layer 32 to form the gate insulating film 33 and the gate layer 34 as shown in FIG. 10B.

The pasting substrate 51 is obtained by stacking an n-InP layer (which is the second layer 34b and also hereinafter referred to as InP layer 34b), an n-InGaAsP layer (which is the first layer 34a and also hereinafter referred to as InGaAsP layer 34a), and an $Al_2O_3$ layer (which is the gate insulating film 33 and also hereinafter referred to as $Al_2O_3$ layer 33) on an InP substrate (the InP substrate is not shown in FIG. 10A.) For example, as an example, the pasting substrate 51 may have a structure in which the n-InGaAsP layer 34a of 110 nm is stacked on the n-InP layer 34b of 50 nm. In this case, the n-InP layer 34b and the n-InGaAsP layer 34a are grown in this order on the InP substrate. Furthermore, in order to selectively remove the InP substrate, a stacked structure of InGaAs/InP/InGaAs may be grown between the InP substrate and the n-InP layer 34b. Thus, by using HCl or the like, the InGaAs layer is not etched, and only the InP substrate can be etched. Thereafter, by selectively etching only the InGaAs layer and selectively etching the InP layer and the InGaAs layer again, a flat surface may be obtained. In this case, the layers grown on the InP substrate are the InGaAs layer, the InP layer, the InGaAs layer, the n-InP layer 34b and the n-InGaAsP layer 34a formed in this order, respectively.

The pasting substrate 51 can be manufactured by the following method. First, according to a metal-organic vapor phase epitaxy (Metal-Organic Vapor Phase Epitaxy) method, an MOCVD (Metal-Organic Chemical Vapor Deposition) method or the like, InP is epitaxially grown on the surface of an InP substrate formed of InP crystal which has been n-doped in advance, thereby forming an InP layer 34b, and InGaAsP is epitaxially grown on the surface of the InP layer 34b to form an InGaAsP layer 34a. The InP layer 34b and the InGaAsP layer 34a are n-type semiconductors, for example, by adding dopants during this epitaxial growth, but they may be made into n-type semiconductors by ion implantation after the epitaxial growth. Next, an $Al_2O_3$ layer 33 having a flat surface is formed at a predetermined thickness on the surface of the InGaAsP layer 34a by using an atomic layer deposition (ALD: Atomic Layer Deposition) method, for example.

When the pasting substrate 51 is pasted onto the Si layer 32, the $Al_2O_3$ layer 33 is brought into close contact with and bonded to the rib 32a and the terraces 36. In this pasting, an $Al_2O_3$ layer (not shown) may be also deposited on the surface of the Si layer 32 by the atomic layer deposition method so that both the surfaces of the $Al_2O_3$ layers can be pasted. By pressurizing and heating (from about 200° C. to 300° C.) after pasting in room temperature atmosphere, the pasting can be performed. This method makes it possible to perform pasting with low damage. Furthermore, a surface activation normal temperature bonding method can also be used for the pasting between the pasting substrate 51 and the Si layer 32. That is, after the respective surfaces of the $Al_2O_3$ layer 33 and the Si layer 32 are activated in vacuum at room temperature, for example, by applying Ar (argon) gas to each of the surfaces, the surface of the $Al_2O_3$ layer 33 is pressed against the ribs 32a and the pair of terraces 36 while brought into close contact with the ribs 32a and the pair of terraces 36. Atomic bonding hands of the respective surfaces of the $Al_2O_3$ layer 33 and each of the rib 32a and the terraces 36 are directly bonded to each other. As a result, the $Al_2O_3$ layer 33, the InGaAsP layer 34a and the InP layer 34b are stacked on the Si layer 32 while the $Al_2O_3$ layer 33 serves as the gate insulating film 33, and the InGaAsP layer 34a and the InP layer 34b serve as the first layer 34a and the second layer 34b of the gate layer 34, respectively. Since the pasting substrate 51 is brought into close contact with the surfaces of the pair of terraces 36 as well as the surface of the rib 32a as described above, the pasting can be performed while maintaining the flatness of the pasting substrate 51.

Note that when the gate layer 34 is configured, for example, as a single layer formed of InGaAsP, InP may be selectively removed with hydrochloric acid (HCl) or the like after the pasting substrate 51 is pasted to the Si layer 32 as described above. Furthermore, when the gate layer 34 is configured a single layer formed of InP, InGaAs and InP layers may be grown on or above the InP substrate, a gate insulating film 33 may be formed on the surface, and then the InP substrate and the InGaAs layer may be selectively etched.

Figure 11:
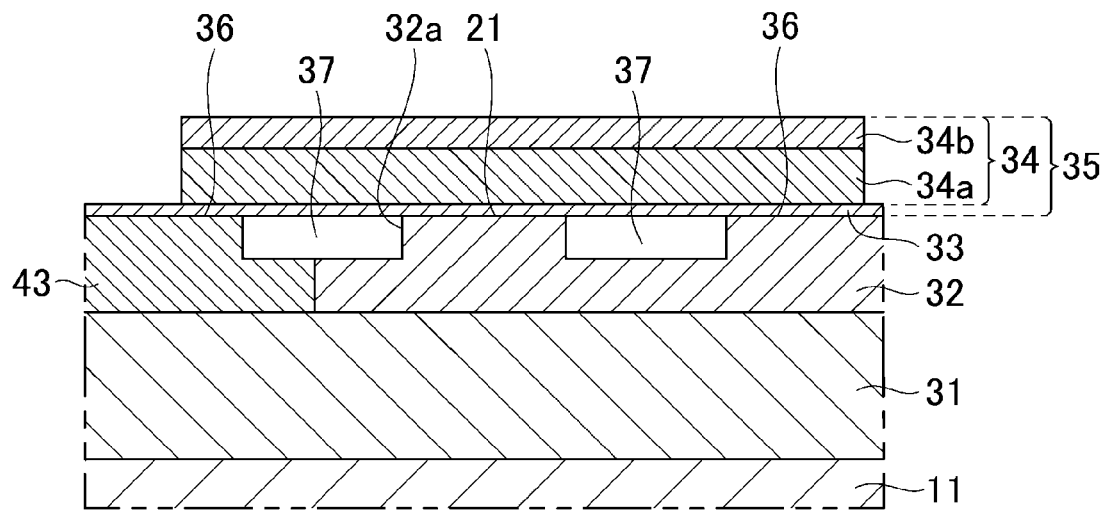
FIG. 11 is a diagram showing a step of etching a gate layer.

In a fourth step, a resist mask having a pattern corresponding to a shape into which the gate layer 34 should be formed is formed on the surface of the gate layer 34, that is, on the surface of the second layer 34b. Thereafter, by dry-etching the gate layer 34, the gate layer 34 on the gate insulating film 33 is formed into a desired shape as shown in FIG. 11. At this time, the gate layer 34 at a portion where the alloy portion 44 and the second electrode 45 will be formed is removed.

Figure 12:
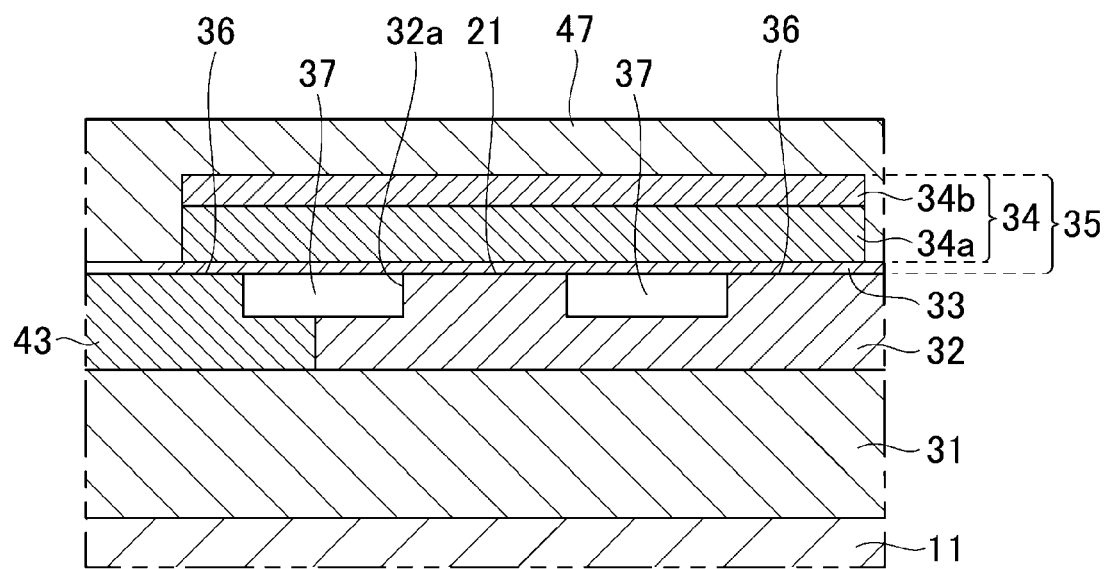
FIG. 12 is a diagram showing a step of forming a protective film.

In a fifth step, a protective film 47 is formed as shown in FIG. 12 by depositing $SiO_2$, for example, by CVD (chemical vapor deposition). The surface of the gate layer 34 is covered with this protective film 47, and also a portion from which the gate layer 34 is removed in the fourth step is filled with the protective film 47. It is also possible to flatten the surface of the protective film 47 by chemical mechanical polishing (CMP; Chemical Mechanical Polishing). In a case where the thickness of the InGaAsP layer/InP layer is small (for example, 160 nm or less), even when a flattering surface is not performed, no trouble occurs in the manufacturing process, and thus the flattening processing can be omitted.

Figure 13:
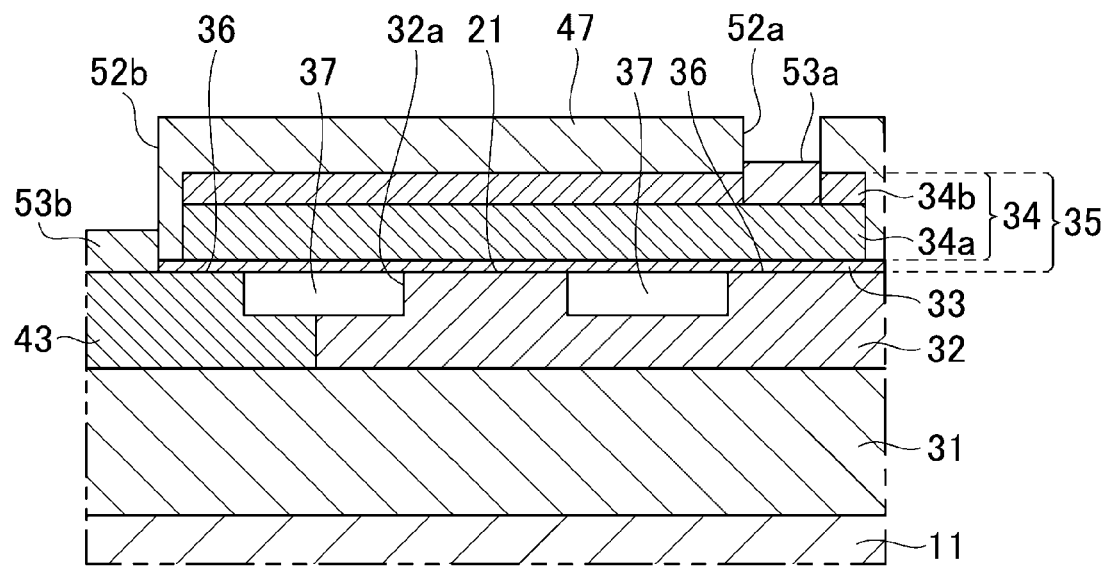
FIG. 13 is a diagram showing a step of forming a via and a Ni layer.

In a sixth step, as shown in FIG. 13, after vias 52a and 52b are formed, Ni layers 53a and 53b for forming the first contact portion 41 and the alloy portion 44 are formed. First, a resist mask which is opened so as to correspond to portions where the first electrode 42 and the second electrode 45 will be formed is formed on the surface of the protective film 47. Under the state where this resist mask is formed, dry etching for $SiO_2$, dry etching for InP, and dry etching for $Al_2O_3$ are sequentially performed while switching etching gas. As a result, the via 52a penetrating through the protective film 47 and the second layer 34b and reaching the surface of the first layer 34a is formed at the position where the first electrode 42 will be formed. Furthermore, the via 52b penetrating through the protective film 47 and reaching the surface of the second contact portion 43 with the gate insulating film 33 being removed is formed at the position where the second electrode 45 will be formed.

Next, under the state where the resist mask is left, Ni is deposited at predetermined thicknesses on the surface of the first layer 34a and the surface of the second contact portion 43a exposed to the bottoms of the vias 52a and 52b, respectively, thereby forming Ni layers 53a and 53b. Thereafter, the resist mask is removed together with Ni deposited on the resist mask by using organic solvent or the like. As described above, the Ni layers 53a and 53b are formed by a lift-off process.

Figure 14:
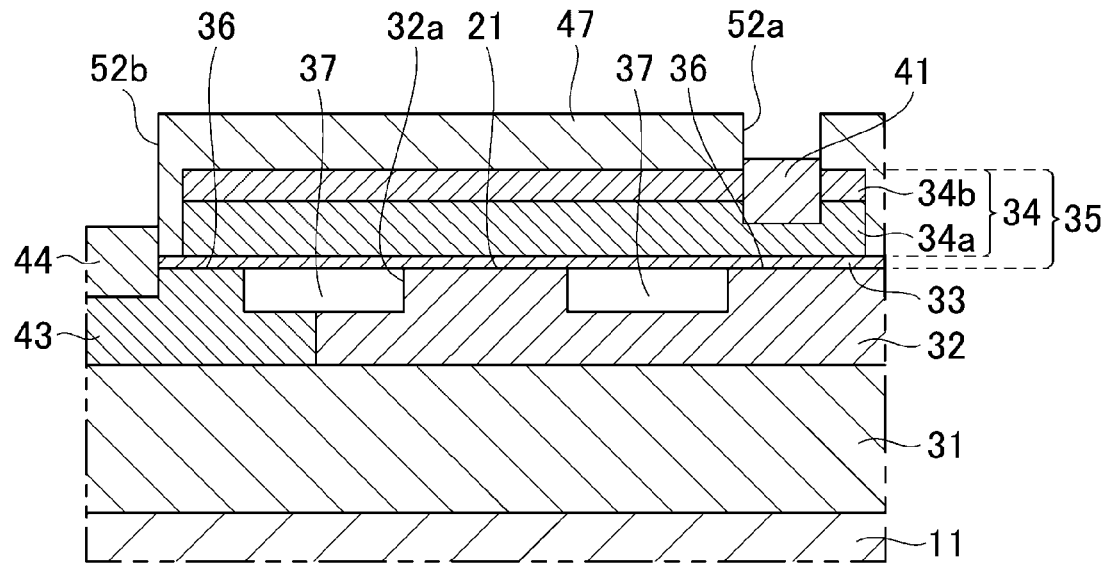
FIG. 14 is a diagram showing a step of alloying an Ni layer.

In a seventh step, the silicon substrate 11 on which the Ni layers 53a and 53b are formed is subjected to an annealing treatment. As a result, as shown in FIG. 14, Ni of the Ni layer 53a and InGaAsP of the first layer 34a react with each other to form the first contact portion 41 made of the alloy thereof. Also, Ni of the Ni layer 53b and Si of the second contact portion 43 react with each other to form the alloy portion 44 made of the alloy thereof. In the annealing treatment, alloying can be performed by heating at a low temperature (400° C. or less).

In an eighth step, a resist mask from which only a resist corresponding to the surface shapes of the first electrode 42 and the second electrode 45 is removed is formed, and Au (gold) is deposited on the surface of the silicon substrate 11, that is, the surface of the protective film 47 and inside the vias 52a and 52b, for example, by an electron beam vapor deposition method. At this time, in order to enhance adhesiveness of Au, Au may be deposited after Ni or Ti of a predetermined film thickness is deposited on the surface of the protective film 47 and inside the vias 52a and 52b. Thereafter, the resist mask is removed together with Au deposited thereon by using organic solvent or the like. As a result, as shown in FIG. 2, the first electrode 42 connected to the gate layer 34 through the first contact portion 41, and the second electrode 45 connected to the Si layer 32 through the alloy portion 44 and the second contact portion 43 are formed, thereby completing the optical modulator 22.

In order to enhance the operation speed of the optical modulator, a structure having a small RC time constant is advantageous. Each example capable of making the RC time constant smaller will be described below. Note that except for the following description, the same as the optical modulator 22 shown in FIG. 2 is applied, substantially the same components are represented by the same reference signs, and detailed description thereon will be omitted.

Figure 15:
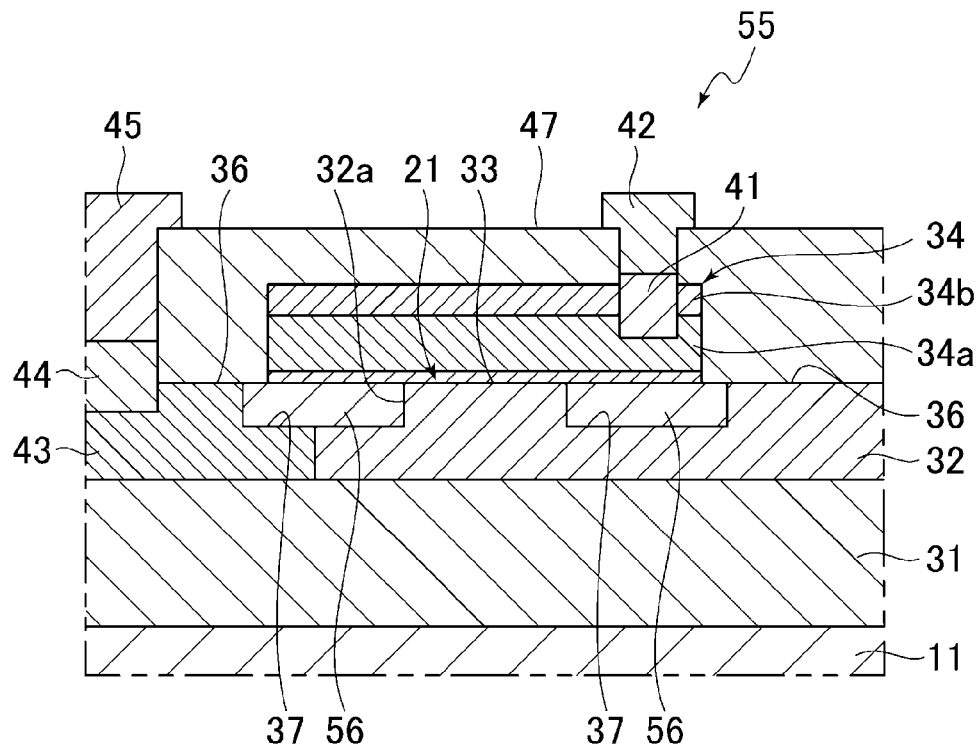
FIG. 15 is a cross-sectional view showing a structure of an optical modulator from which the gate layer on the terrace has been removed.

An optical modulator 55 shown in FIG. 15 has a structure in which the gate portion 35 (the gate insulating film 33 and the gate layer 34) is not formed above the pair of terraces 36. That is, the gate portion 35 is formed so that one end portion of the first extending region of the gate insulating film 33 and the gate layer 34 is located above the trench 37 between the rib 32a and the terrace 36 in the width direction of the rib 32a. As a result, the area of the gate insulating film 33 sandwiched between the Si layer 32 and the gate layer 34 is reduced, and thus a parasitic capacitance is reduced. The protective film 47 is provided on each of the terraces 36. The first contact portion 41 is provided in one first extending region of the gate layer 34, that is, in a portion of the gate layer 34 which is located above one of the trenches 37.

In this example, the trenches 37 are provided with insulating layers 56 made of $SiO_2$ in the trenches 37. The insulating layer 56 may be formed by using another material as long as the material functions as a clad having a lower refractive index than the Si layer 32 and has an insulating property.

When the optical modulator 55 as described above is manufactured, after the trenches 37 are formed in the first step, $SiO_2$ is deposited on the surface of the gate layer 34, for example, by CVD. Thereafter, $SiO_2$ deposited on other portions than the trenches 37 is removed by the chemical mechanical polishing to form a structure in which the insulating layer 56 is embedded in the trenches 37. Thereafter, in the third step, a pasting substrate 51 serving as the gate layer 34 is pasted onto the surfaces of the Si layer 32 and the insulating layer 56. In the fourth step, a resist mask having a predetermined pattern is formed on the surface of the gate layer 34, and an unnecessary portion of the gate layer 34 containing a portion of the gate layer 34 which is located above each terrace 36 is removed by dry etching or the like. Note that the gate insulating film 33 may be provided only at least between the rib 32a and the gate layer 34.

Figure 16:
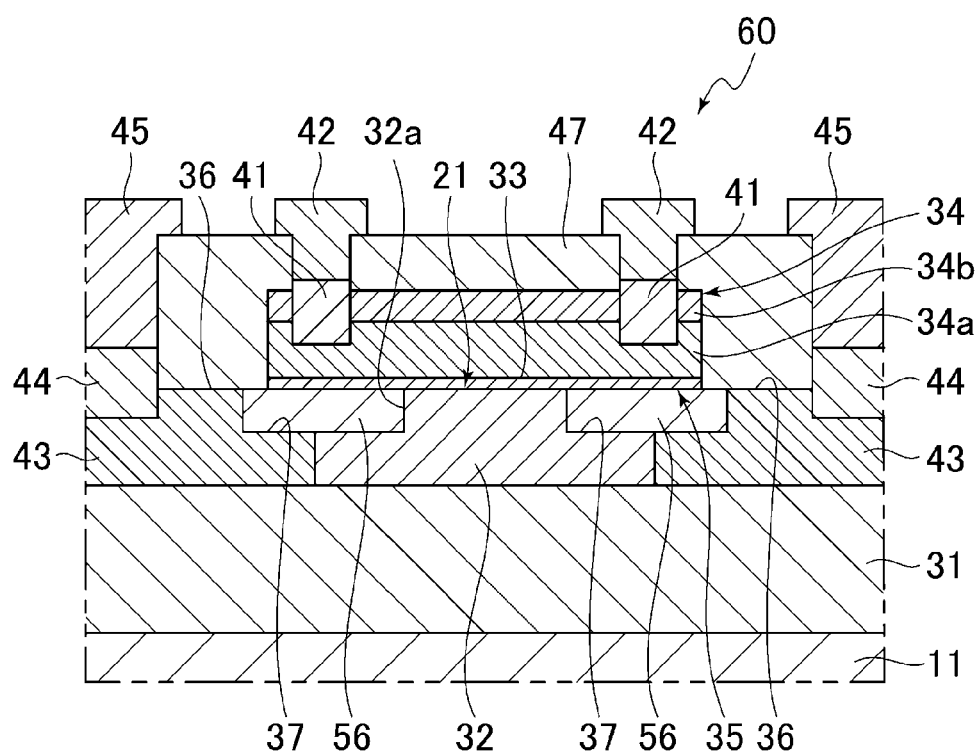
FIG. 16 is a cross-sectional view showing a structure of the optical modulator in which first and second contact portions are provided on both sides of the rib, respectively.

An optical modulator 60 shown in FIG. 16 has a structure in which a pair of first contact portions 41 and a pair of second contact portions 43 are provided. The first contact portion 41 is provided in each of the first extending regions of the gate layer 34 extending to both sides of the rib 32a, and the first electrodes 42 are provided on an upper side of the first contact portions 41, respectively. In this way, the optical modulator 60 is configured so that the first contact portions 41 are arranged above the respective trenches 37 (the insulating layers 56) with avoiding the upper side of the rib 32a. Furthermore, a pair of second contact portions 43 are provided in the second extending regions on both sides of the optical waveguide 21 of the Si layer 32 respectively, and the alloy portion 44 and the second electrode 45 are provided on an upper side of each of the second contact portions 43. Note that the other configuration is the same as that of the optical modulator 55 in FIG. 11.

In the optical modulator 60 described above, the pair of first contact portions 41 and the pair of second contact portions 43 are provided to each of the gate layer 34 and the Si layer 32, so that on-circuit parasitic resistance in the optical modulator 60 to which the drive voltage V1 is applied is reduced by half. In cooperation with the reduction of the parasitic resistance of the optical modulator 55 by the structure in which the area of the gate insulating film sandwiched between the Si layer 32 and the gate layer 34 is reduced, the RC time constant of the optical modulator 60 is further reduced, so that the operation can be performed at a higher speed.

Figure 17:
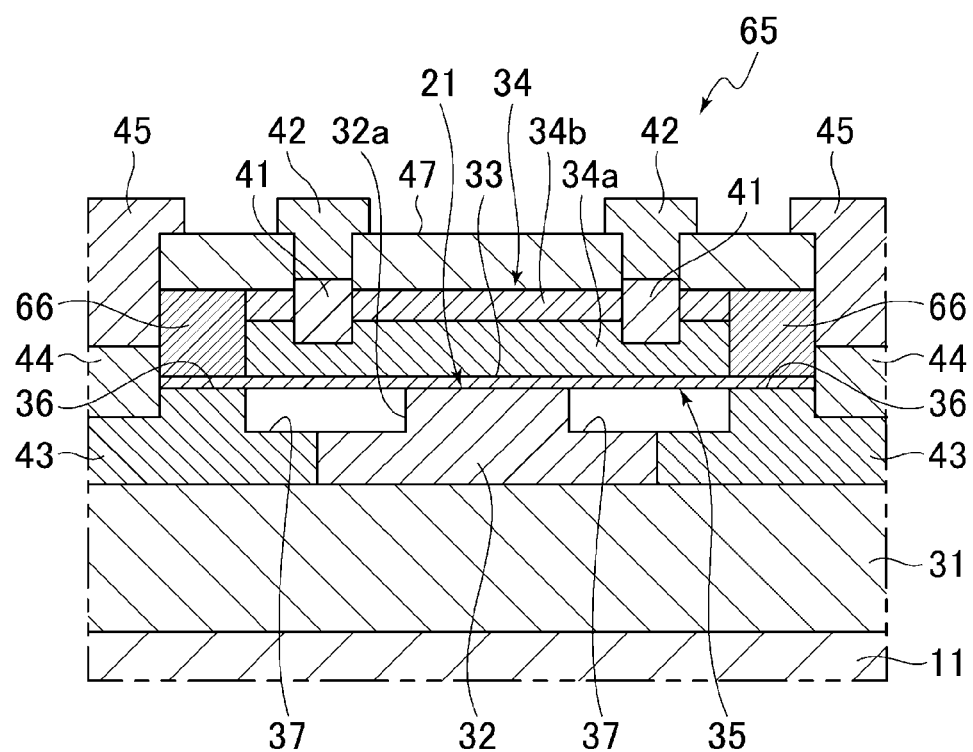
FIG. 17 is a cross-sectional view showing a structure of the optical modulator in which the gate layer on the terrace is changed to an insulated layer.

An optical modulator 65 shown in FIG. 17 has a structure in which portions of the gate layer 34 on the upper sides of the pair of terraces 36 are provided with insulated layers 66 implanted with hydrogen ions. By implanting hydrogen ions into the group III-V semiconductor, the group III-V semiconductor increases in resistance, and functions as an insulating material. That is, the group III-V group semiconductor containing hydrogen is the insulated layer 66. The other configuration is the same as the optical modulator 60 in FIG. 16. The area of the gate insulating film 33 sandwiched between the Si layer 32 and the gate layer 34 is reduced by the insulated layer 66, and thus the parasitic capacitance is reduced. When this optical modulator 65 is manufactured, for example, after the pasting substrate 51 is pasted onto the Si layer 32 in the third step, a resist mask which is opened at a portion corresponding to the insulated layer 66 is formed on the surface of the gate layer 34. After the formation of the resist mask, hydrogen ions are implanted from the surface of the gate layer 34. As a result, a part of the gate layer 34, that is, the gate layer 34 above each terrace 36 is changed into the insulated layer 66. Although the trenches 37 are made hollow, insulating layers may be provided inside the trenches 37 like the optical modulators 55 and 60 in FIG. 15 and FIG. 16.

Figure 18:
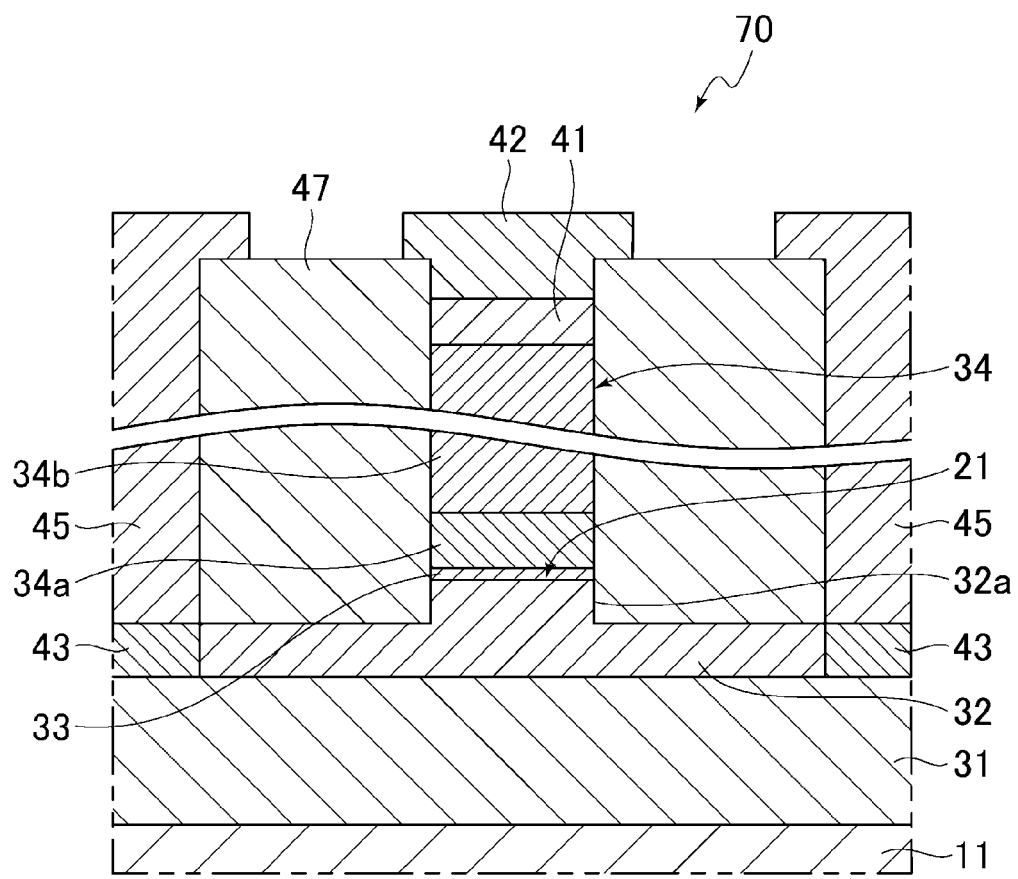
FIG. 18 is a cross-sectional view showing a structure of the optical modulator in which the gate layer is provided only on the terrace.

An optical modulator 70 shown in FIG. 18 has a structure in which the gate portion 35 (the gate insulating film 33, the gate layer 34) is provided only on an upper side of the rib 32a and just above the rib 32a. The Si layer 32 is provided with the rib 32a on a flat surface of the Si layer 32, and the gate portion 35 (the gate insulating film 33, the gate layer 34)

is formed on an upper side of the rib 32a. By providing the gate portion 35 only just above the rib 32a as described above, the area of the gate insulating film 33 sandwiched between the Si layer 32 and the gate layer 34 is reduced, and the parasitic capacitance is reduced.

Furthermore, in the optical modulator 70, the first contact portion 41 is provided on an upper side of the second layer 34b of the gate layer 34. The first contact portion 41 is formed of, for example, InGaAs which is n-doped with a high concentration. The first electrode 42 is formed on an upper side of this first contact portion 41. When the first electrode 42 is provided on an upper side of the gate layer 34 just above the rib 32a as described above, it is preferable that the gate layer 34 is caused to have a sufficient thickness (for example, 1.3 to 2 μm). As a result, the first electrode 42 can be sufficiently apart from the rib 32a, and the optical confinement effect can be enhanced.

Furthermore, the Si layer 32 is provided with the second contact portions 43 in the second extending regions on both sides of the optical waveguide 21, respectively. The second contact portions 43 are formed by p-doping the Si layer 32 with a high concentration. The second electrodes 45 are provided on upper sides of the second contact portions 43. Like the other optical modulators, the first contact portion 41 and the second contact portions 43 may be made of an alloy of Ni and the group III-V semiconductor.

The optical modulator 70 can also be manufactured by the following procedure, for example. Note that the manufacturing procedure of the optical modulator 70 described below is merely an example, and the present invention is not limited thereto. In the manufacturing of the optical modulator 70, an SOI substrate can be used in the same manner as described above.

In a first step, for example, an SOI substrate is prepared and p-type impurities are doped into the Si layer 32 of the SOI substrate. Next, in a second step, $Al_2O_3$ is deposited on the surface of the Si layer 32 and the surface of the pasting substrate, for example, by an ALD method, and these $Al_2O_3$ films are pasted to each other, whereby the pasting substrate in which the gate insulating film 33, the first layer 34a and the second layer 34b of the gate layer 34, and a layer serving as the first contact portion 41 are stacked is pasted onto the SOI substrate. Here, as the pasting substrate is used a laminate in which an $Al_2O_3$ layer serving as the gate insulating film 33, an InGaAsP layer serving as the first layer 34a of the gate layer 34, an InP layer serving as the second layer 34b, and an InGaAs layer serving as the first contact portion 41 are stacked. When this pasting substrate is manufactured, the InGaAsP layer and the InGaAs layer are successively epitaxially grown and formed on one surface and the other surface of a substrate, respectively, the substrate being formed of InP crystal which is n-doped in advance and serving as the InP layer. In the n-doping of the InGaAsP layer and the InP layer, dopants may be added during epitaxial growth, or ion implantation may be performed after epitaxial growth.

In a third step, a metal mask is formed on the surface of a layer serving as the first contact portion 41 by using a patterned resist mask. The metal mask is formed so as to have a pattern of a gate serving as a phase modulation portion. After the resist mask is once removed, resist is coated again, and this resist is patterned to have the shape of a waveguide at this time. Not only the pasting substrate (the gate insulating film 33, the gate layer 34 including the first layer 34a and the second layer 34b, and the layer serving as the first contact portion 41), but also the Si layer 32 is patterned by dry etching using the resist mask, whereby the Si layer 32 is also processed to have the shape of a waveguide (the rib is formed in the Si layer 32).

In a fourth step, after removing the resist mask used in the third step, the gate insulating film 33 and the gate layer 34 including the first layer 34a and the second layer 34b which exclude the gate pattern portion serving as the phase modulation portion, and the layer serving as the first contact portion 41 are removed with the remaining metal mask by dry etching. Subsequently, in a fifth step, $SiO_2$ is deposited, for example, by the CVD method to form the protective film 47, and chemical mechanical polishing is performed so that the surface of the protective film 47 becomes flat.

In a sixth step, a resist mask having a predetermined pattern is formed on the surface of the protective film 47, and then dry etching is performed to form vias for the first electrode 42 and the second electrode 45 on the protective film 47, respectively. In a seventh step, Au (gold) is deposited inside the vias, for example, by sputtering while the resist mask used in the sixth step is left. After removing the resist mask, dry etching is performed by using a new resist mask having a predetermined pattern to remove excessive Au. As a result, the first electrode 42 and the second electrode 45 are made to have predetermined surface shapes.

In the foregoing description, the rib type optical waveguide having the rib formed on the surface of the Si layer has been described. However, the present invention is not limited to this, and may be also applied to, for example, a structure in which an optical waveguide is configured by a Si layer having a flat surface or the like.

REFERENCE SINGS LIST

10 Mach-Zehnder interferometer type optical intensity modulator
21, 23 optical waveguide
22, 24, 55, 60, 65, 70 MOS optical modulator
32 Si layer
32a rib
33 gate insulating film
34 gate layer
34a first layer
34b second layer
41 first contact portion
43 second contact portion

The invention claimed is:

1. A MOS optical modulator comprising:
a p-type Si layer constituting an optical waveguide;
a gate insulating film provided on the optical waveguide;
a gate layer provided on the gate insulating film and formed of an n-type group III-V semiconductor; and
a first contact portion connected to the gate layer and a second contact portion connected to the Si layer for applying a drive voltage between the Si layer and the gate layer.

2. The MOS optical modulator according to claim 1, wherein the gate layer has a first extending region extending outwards in a width direction of the optical waveguide, and the first contact portion is provided in the first extending region.

3. The MOS optical modulator according to claim 2, wherein the first extending region is provided on each of both sides of the optical waveguide, the first contact portion is provided in each of the first extending regions on both sides of the optical waveguide, and the second contact portion is provided in each of second extending regions which extend from the optical waveguide of the Si layer to both sides of the optical waveguide.

4. The MOS optical modulator according to claim 3, wherein the Si layer has a rib constituting the optical waveguide, and a pair of terraces which are located on both sides of the ribs so as to be apart from the rib, and each of end portions of the first extending regions in the width direction of the optical waveguide is located above a space between the rib and the terrace.

5. The MOS optical modulator according to claim 1, wherein the first contact portion is an alloy of a group III-V semiconductor of the gate layer and Ni.

6. A method of manufacturing a MOS optical modulator comprising:
    a gate forming step of pasting a substrate having a gate layer including a single layer or a plurality of layers made of an n-type group III-V semiconductor and a gate insulating film formed on a surface of the gate layer onto an upper surface of a p-type Si layer serving as an optical waveguide while the gate insulating film and the upper surface of the optical waveguide are brought into close contact with each other, thereby forming the gate insulating film and the gate layer on the optical waveguide; and
    a contact portion forming step of forming a first contact portion connected to the gate layer and a second contact portion connected to the Si layer for applying a voltage between the Si layer and the gate layer.

7. The method of manufacturing a MOS optical modulator according to claim 6, wherein the gate forming step includes bringing the gate insulating film into close contact with each of an upper surface of a rib provided to the Si layer constituting the optical waveguide and upper surfaces of a pair of terraces which are provided on both sides of the rib so as to be apart from the rib.

8. The method of manufacturing a MOS optical modulator according to claim 7, wherein hydrogen ions are implanted into regions of the gate layer which are located above the pair of terraces, thereby forming an insulated layer.

* * * * *